United States Patent [19]
Shibata

[11] Patent Number: 5,401,199
[45] Date of Patent: Mar. 28, 1995

[54] OUTBOARD MOTOR ENGINE

[75] Inventor: Yasuhiko Shibata, Hamamatsu, Japan

[73] Assignee: Sanshin Kogyo Kabushiki Kaisha, Hamamatsu, Japan

[21] Appl. No.: 139,926

[22] Filed: Oct. 21, 1993

[30] Foreign Application Priority Data

Oct. 21, 1992 [JP] Japan .................................. 4-305902

[51] Int. Cl.6 ............................................ B63H 23/06
[52] U.S. Cl. ........................................ 440/52; 440/83
[58] Field of Search ............... 440/52, 49, 75, 83; 123/52 A, 52 MB, 195 P, 195 E

[56]  References Cited

U.S. PATENT DOCUMENTS

| | | | |
|---|---|---|---|
| 3,310,021 | 3/1967 | Shimanckas | 440/52 |
| 4,615,683 | 10/1986 | Harada et al. | 440/52 |
| 4,767,365 | 8/1988 | Nakahama et al. | 440/86 |

Primary Examiner—Stephen P. Avila
Attorney, Agent, or Firm—Knobbe, Martens, Olson & Bear

[57]  ABSTRACT

Two embodiments of balancer arrangements for internal combustion engines particularly adapted for use in outboard motors. In each embodiment, the balancer shaft is journalled within the crankcase chamber of the engine and is driven from the crankcase from a point between its ends. Single and twin balancer shaft arrangements are disclosed.

20 Claims, 3 Drawing Sheets

OUTBOARD MOTOR ENGINE

BACKGROUND OF THE INVENTION

This invention relates to an outboard motor engine and more particularly to an improved balancing arrangement for the internal combustion engine of an outboard motor.

As is well known, outboard motors present certain problems in conjunction with the design of their components due to their compact nature and the fact that the engine normally is positioned with its output shaft rotating about a vertically disposed, rather than a horizontally disposed axis. As is also well known, reciprocating engines have a number of forces and moments which may not be internally balanced within the engine, although balancing masses on the crankshaft are frequently employed.

For many types of engine vibrations, it is desirable to provide a separate balancing shaft or shafts containing one or more balancing weights that are driven from the engine output shaft and which balance the various forces on the engine to reduce vibrations. With outboard motors, it has been the practice to position such balance shafts at the end of the engine with the balance masses at the engine end. This has a number of disadvantages.

In the first instance, by placing the balance mass at the end of the engine although some forces are balanced, undesirable vibrational couples may be generated. In addition, it is undesirable to extend the length of the engine due to its vertical disposition. If the engine is made higher, than the center of gravity of the outboard motor or the propulsion unit is raised and this is not always desirable.

It is, therefore, a principal object to this invention to provide an improved arrangement for balancing an internal combustion engine employed with an outboard motor.

It is a further object to this invention to provide an improved balancing arrangement for an internal combustion engine wherein forces can be balanced and the balancing arrangement can be maintained compact along with the overall engine.

In addition to the problems discussed above, it is also desirable to provide an improved arrangement wherein the balancing shaft for an outboard motor can be adequately supported and yet, provide a compact assembly for the engine. Frequently, the balancing shaft for the engine are journalled by the cylinder block assembly and this gives rise to a complex and sizeable cylinder block.

It is, therefore, a still further object to this invention to provide an improved arrangement for journaling the balancing shaft of an internal combustion engine.

SUMMARY OF THE INVENTION

This invention is adapted to be embodied in an outboard motor having a power head comprised of an internal combustion engine that comprises a cylinder block and a crankcase defining a crankcase chamber. A crankshaft is journalled in the crankcase chamber for rotation about a generally vertically extending axis. A balance shaft is driven by the crankshaft and is positioned within the crankcase chamber.

DETAILED DESCRIPTION OF THE PREFERRED EMBODIMENTS OF THE INVENTION

Figure 1:
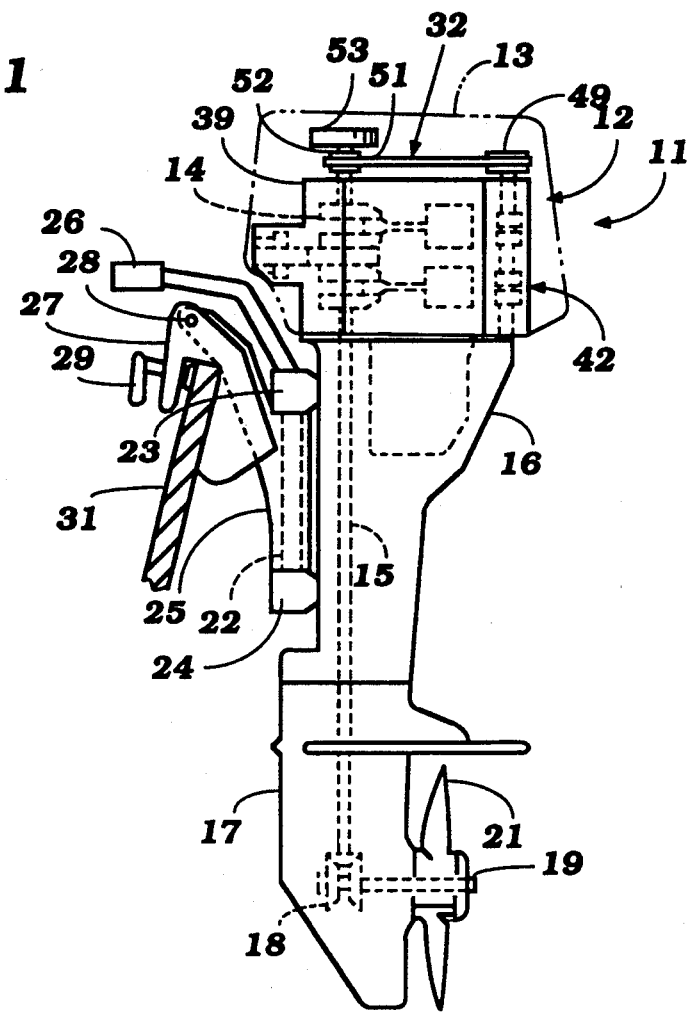
FIG. 1 is a side elevational view of an outboard motor constructed in accordance with an embodiment of the invention, with a portion shown in phantom and attached to the transom of an associated watercraft, shown partially and in cross section.

Referring first in detail to FIG. 1, an outboard motor constructed in accordance with a first embodiment of the invention is identified generally by the reference numeral 11. The invention is depicted in conjunction with an outboard motor because it has particular utility in such applications due to their compact nature and the desirability of maintaining a low center of gravity, particularly for the powerhead portion. It is to be understood, however, that this invention has utility in other applications for marine propulsion units and particularly those where the engine operates with its output shaft rotating about a vertically extending axis.

The outboard motor 11 includes a powerhead comprised of an internal combustion engine, indicated generally by the reference numeral 12 and which is surrounded by a protective cowling, shown in phantom and identified generally by the reference numeral 13. The engine 12, as is typical with outboard motor practice, is disposed so that its crankshaft 14 rotates about a vertically extending axis so as to be drivingly coupled to a vertically extending drive shaft 15.

The drive shaft 15 is rotatably journalled within a drive shaft housing 16 which depends from the powerhead thus far described. This drive shaft 15 further extends into a lower unit 17 formed at the lower portion of the drive shaft housing 16 and drives a conventional forward, neutral, reverse bevel gear transmission 18. The bevel gear transmission 18 is selectively adapted to drive a propeller shaft 19 in forward or reverse direction so as to drive an associated propeller 21 in those directions.

A steering shaft 22 is affixed to the drive shaft housing 16 by upper and lower brackets 23 and 24. This steering shaft 22 is journalled for steering movement about a vertically extending steering axis within a swivel bracket 25. A tiller 26 is affixed to the upper end of the steering shaft 22 for steering of the outboard motor 11 in a well known manner. The swivel bracket 25 is pivotally connected to a clamping bracket 27 by means of a pivot pin 28 for tilt and trim movement of the outboard motor 11 as is well known in this field. A clamping device 29 is carried by the clamping bracket 27 so as to provide a detachable connection to a transom 31 of an associated watercraft.

The construction of the outboard motor 11 as thus far described may be considered to be conventional and, for that reason, further details of the construction of the outboard motor 11 are not believed to be necessary to enable those skilled in the art to practice the invention. The invention deals primarily with the construction of the engine 12 and the balancing arrangement therefore and this arrangement will now be described in more detail by reference to FIGS. 2 and 3.

In the two embodiments of the invention which will be described, the engine 12 is of the two cylinder, in-line type. It should be readily apparent to those skilled in the art how the invention can be practiced with engines having other cylinder numbers and other cylinder configurations. The engine 12 in each embodiment is also of the four cycle type, but it is also to be understood that certain facets of the invention maybe employed with two cycle engines.

The engine 12 is comprised of a cylinder block, indicated generally by the reference numeral 32 that is formed with a pair of aligned cylinder bores 33 in which pistons 34 are supported for reciprocation. The pistons 34 are connected to connecting rods 35 by piston pins 36 in a well known manner. The connecting rods 35 are, in turn, pivotally connected on respective rod bearing portions 37 of the crankshaft 14 which are offset from the rotational axis of the crankshaft 14 by throws 38.

The crankshaft 14 is, in turn, journalled by means of a pair of bearings carried by the cylinder block 32 and a crankcase member 39 that is affixed to the cylinder block 32 in a known manner and which defines a crankcase chamber 41 in which the crankshaft 14 rotates. As previously noted, the crankshaft 14 has a suitable connection, such as a splined connection, to the drive shaft 15.

A cylinder head assembly, indicated generally by the reference numeral 42 is affixed to the cylinder block 32 in a well known manner. The cylinder head assembly 42 is provided with recesses 43 which form in part the combustion chambers of the engine. Intake 44 and exhaust 45 valves are supported within the cylinder head assembly 42 in a known manner and deliver a fuel/air charge to the combustion chambers 43 and discharge the burnt charge from the combustion chambers 43 in a known manner through suitable intake and exhaust systems. These valves are operated by means of a camshaft 46 that is journalled in the cylinder head assembly 42 and which operates the intake and exhaust valves 44 and 45, respectively, by means of rocker arms 47 and 48 that are journalled on rocker arm shafts in the cylinder head assembly 42.

The valve and valve operating mechanism forms no part of the invention and, for that reason, further description of it is not believed to be necessary. However, the camshaft 46 is driven by a toothed pulley 49 that is fixed to the upper end of the camshaft 46 and is driven by a toothed belt 51 from a sprocket 52 that is fixed to the upper end of the crankshaft 14. An inertial damper 53 may be also affixed to the upper end of the crankshaft 14 above the sprocket 52 as shown in FIG. 1 for damping torsional vibrations of the crankshaft 14.

The engine 12 is also provided with a lubricating system and this includes a lubricant pump, indicated generally by the reference numeral 54 which is driven from the lower end of the camshaft 46 and which draws lubricant from an oil tank 55 which depends into the drive shaft housing 16 through a supply line 56 and pick up 57. This lubricant is circulated through the engine in an appropriate fashion and is returned to the oil tank 55 through a drain opening 58 formed in a lower support plate 59 affixed to the lower end of the engine 12 and to the upper end of the drive shaft housing 16. As with other details of the engine as thus far described, this arrangement may be considered to be conventional for the purposes of this description.

In accordance with the invention, a balancer shaft arrangement, indicated generally by the reference numeral 61 is contained within the crankcase chamber 41, driven by the crankshaft 14 between its ends and journalled in a manner to be described for balancing certain vibratory forces generated by the engine 12. In this embodiment, the balancer shaft 61 includes a shaft part 62 that is affixed to a pair of flanges formed on a crankcase insert member 63 which is fixed by fasteners 64 in an opening 65 formed in the crankcase member 39. A pair of bearings 66 are provided on the ends of the shaft 62 and journal a balancer mass 67 that is rotatably journalled on the shaft 62. The balancer mass 67, as clearly shown in FIG. 3, includes an inertial weight 68 that is offset from the axis of rotation of the balancer 67.

The balancer mass 68 further includes an integral gear 69 that is enmeshed with a drive gear 71 formed on the crankshaft 14 between adjacent throws 38. The balancer mass 67 is driven at the same speed but in the opposite direction to the crankshaft 14 so as to balance certain forces, as is well known in the balancing art.

Since the drive gear 71 is positioned between the two cylinder bores 33 there will be no couples generated by its operation and efficient balancing can be accomplished. In addition, since the mass 67 and its driving arrangement is contained within the crankcase chamber 41, it will be lubricated by the lubricating system of the engine and since the journaling for this is provided entirely through the insert piece 63, the cylinder block 32 and crankcase member 39 need not be specially formed to provide any bearing portions.

Figure 3:
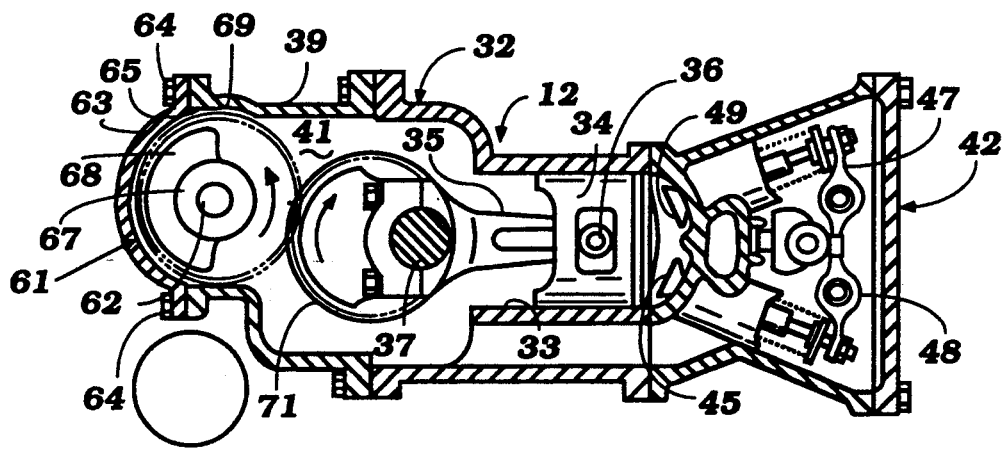
FIG. 3 is a reduced scale, cross sectional view taken along the line 3—3 of FIG. 2.
Figure 2:
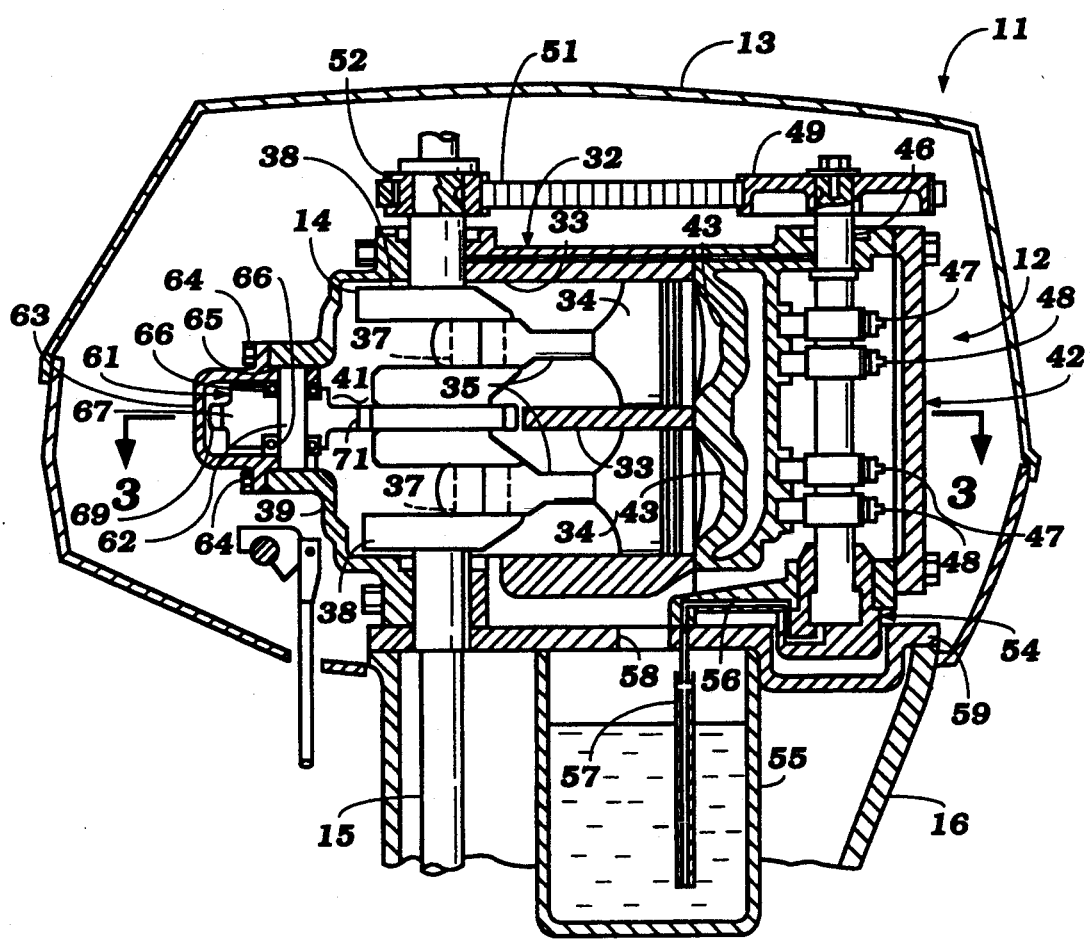
FIG. 2 is an enlarged vertical cross sectional view taken through the powerhead of the internal combustion engine of this embodiment.
Figure 4:
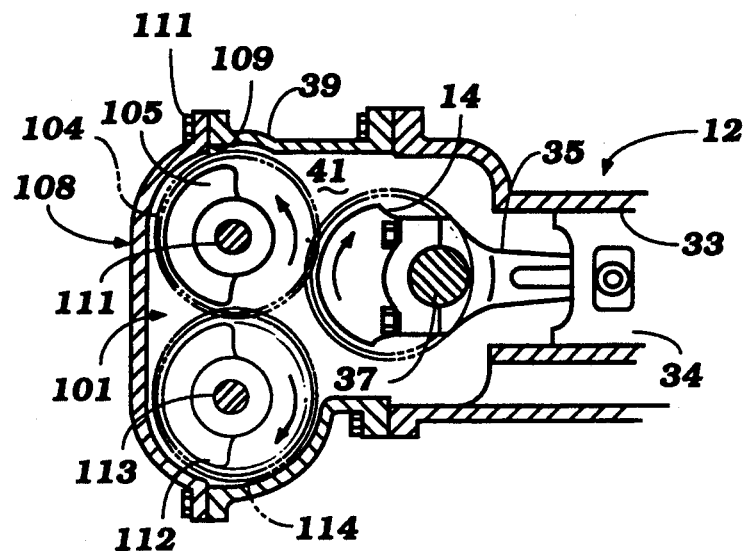
FIG. 4 is a partial cross sectional view, in part similar to FIG. 3, and shows another embodiment of the invention.
Figure 5:
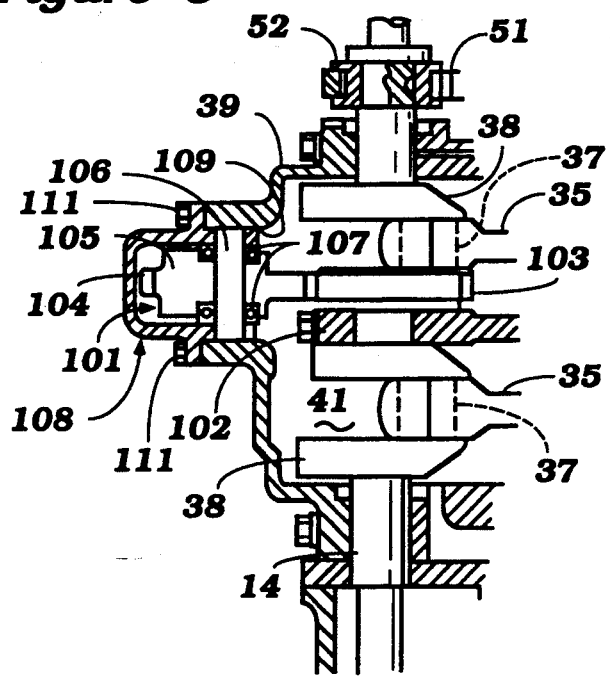
FIG. 5 is a cross sectional view, in part similar to FIG. 2, for the embodiment of FIG. 4.

FIGS. 4 and 5 show another embodiment of the invention which is generally similar to the embodiment of FIGS. 1 through 3 and, for that reason, a description of only the portion of the engine which depicts the balancer arrangement is believed to be necessary to permit those skilled in the art to practice the invention.

In FIGS. 4 and 5 components which are the same or substantially the same as those components previously described have been identified by the same reference numerals and will be described again only insofar as is necessary to understand the construction and operation of this embodiment. In this embodiment, the drive gear for the balancer assembly, which balancer assembly is indicated generally by the reference numeral 101 is offset slightly from the center of the crankshaft so as to accommodate a center main bearing 102 for the crankshaft 14. A balancer drive gear 103 is formed integrally with the cheeks of one of the throws 38, in this case the uppermost throw 38. The drive gear 103 is, however, formed immediately adjacent the center main bearing 102 and drives a drive gear 104 that is formed integrally with a first inertial mass 105. The inertial mass 105 is supported on a stub shaft 106 by spaced bearings 107. The stub shaft 106 is journalled in a balancer shaft supporting member 108 which, like the previously described embodiment, is contained within a recess 109 of the crankcase member 39 and is held in place by fasteners 111.

In this embodiment, there is provided a second inertial mass 112 that is also journalled on its own stub shaft 113 which is supported like the stub shaft 111 in the balancer supporting member 108. The inertial mass 112 has an integral drive gear portion 114 that is engaged with the drive gear 104 of the first inertial mass 105. It should be noted that the inertial masses 105 and 112 are in the same phase, but rotate in opposite directions. Thus, in addition to balancing forces these inertial masses will also balance couples. Again, the specific form of balancing is well within the scope of those skilled in the art and further description of it is not believed to be necessary.

It should be readily apparent that the foregoing embodiments provide very compact and effective balancer arrangements for internal combustion engines that adapted the engines to the compact nature required for marine application. Of course, the embodiments as described are only preferred embodiments and various changes and modifications may be made without departing from the spirit and scope of the invention, as defined by the appended claims.

I claim:

1. An outboard motor having a powerhead comprised of an internal combustion engine comprised of a cylinder block and a crankcase defining a crankcase chamber, a crankshaft journalled in said crankcase chamber for rotation about a generally vertically extending axis, and a balancer shaft driven by said crankshaft and journalled within said crankcase chamber.

2. An outboard motor as set forth in claim 1 wherein the balancer shaft is driven from the crankshaft between its ends.

3. An outboard motor as set forth in claim 2 wherein the crankshaft has at least one throw formed with an integral gear for driving the balancer shaft.

4. An outboard motor as set forth in claim 2 wherein the crankshaft has a pair of throws and the balancer shaft is driven between the throws.

5. An outboard motor as set forth in claim 4 wherein the balancer shaft is driven by a gear formed integrally with one of the throws of the crankshaft.

6. An outboard motor as set forth in claim 5 wherein there are a pair of balancer shafts one of which is driven from the crankshaft and which one drives the other.

7. An outboard motor as set forth in claim 6 wherein the balancer shafts are driven at the same speed as the crankshaft.

8. An outboard motor as set forth in claim 1 wherein the balancer shaft is journalled solely by the crankcase.

9. An outboard motor as set forth in claim 8 wherein the balancer shaft is journalled by a separate insert piece affixed to the crankcase.

10. An outboard motor as set forth in claim 9 wherein the balancer shaft is driven from the crankshaft between its ends.

11. An outboard motor as set forth in claim 9 wherein the crankshaft has at least one throw formed with an integral gear for driving the balancer shaft.

12. An outboard motor as set forth in claim 10 wherein the crankcase has a pair of throws and the balancer shaft is driven between the throws.

13. An outboard motor as set forth in claim 12 wherein the balancer shaft is driven by a gear formed integrally with one of the throws of the crankshaft.

14. An outboard motor as set forth in claim 13 wherein there are a pair of balancer shafts one of which is driven from the crankshaft and which one drives the other.

15. An outboard motor as set forth in claim 14 wherein the balancer shafts are driven at the same speed as the crankshaft.

16. An outboard motor as set forth in claim 1 wherein the balancer shaft is completely located within the crankcase chamber.

17. An outboard motor as set forth in claim 4 wherein the balancer shaft is completely located within the crankcase chamber.

18. An outboard motor as set forth in claim 5 wherein the balancer shaft is completely located within the crankcase chamber.

19. An outboard motor as set forth in claim 8 wherein the balancer shaft is completely located within the crankcase chamber.

20. An outboard motor as set forth in claim 12 wherein the balancer shaft is completely located within the crankcase chamber.

* * * * *